Jan. 31, 1928.
E. P. ARMSTRONG
1,657,735
SAW SWAGE
Filed Aug. 27, 1924   3 Sheets-Sheet 1
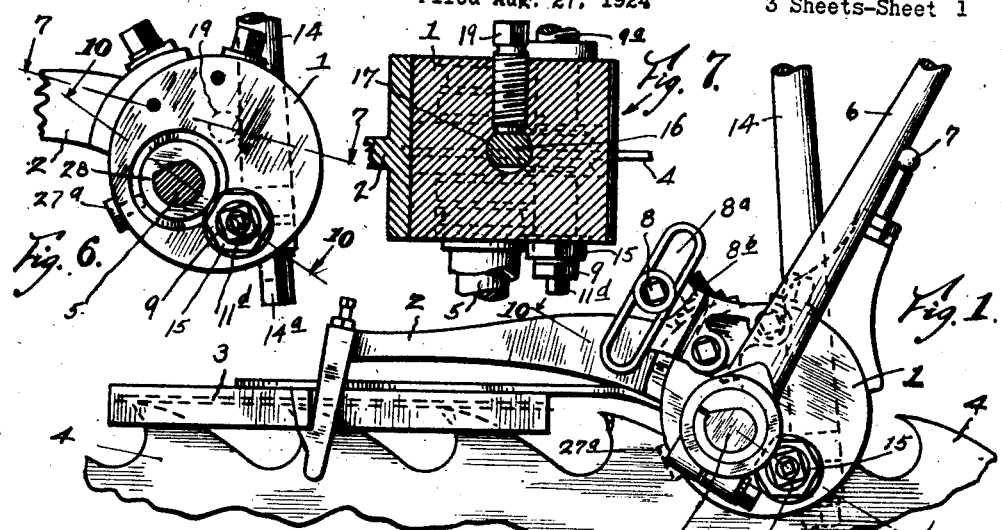

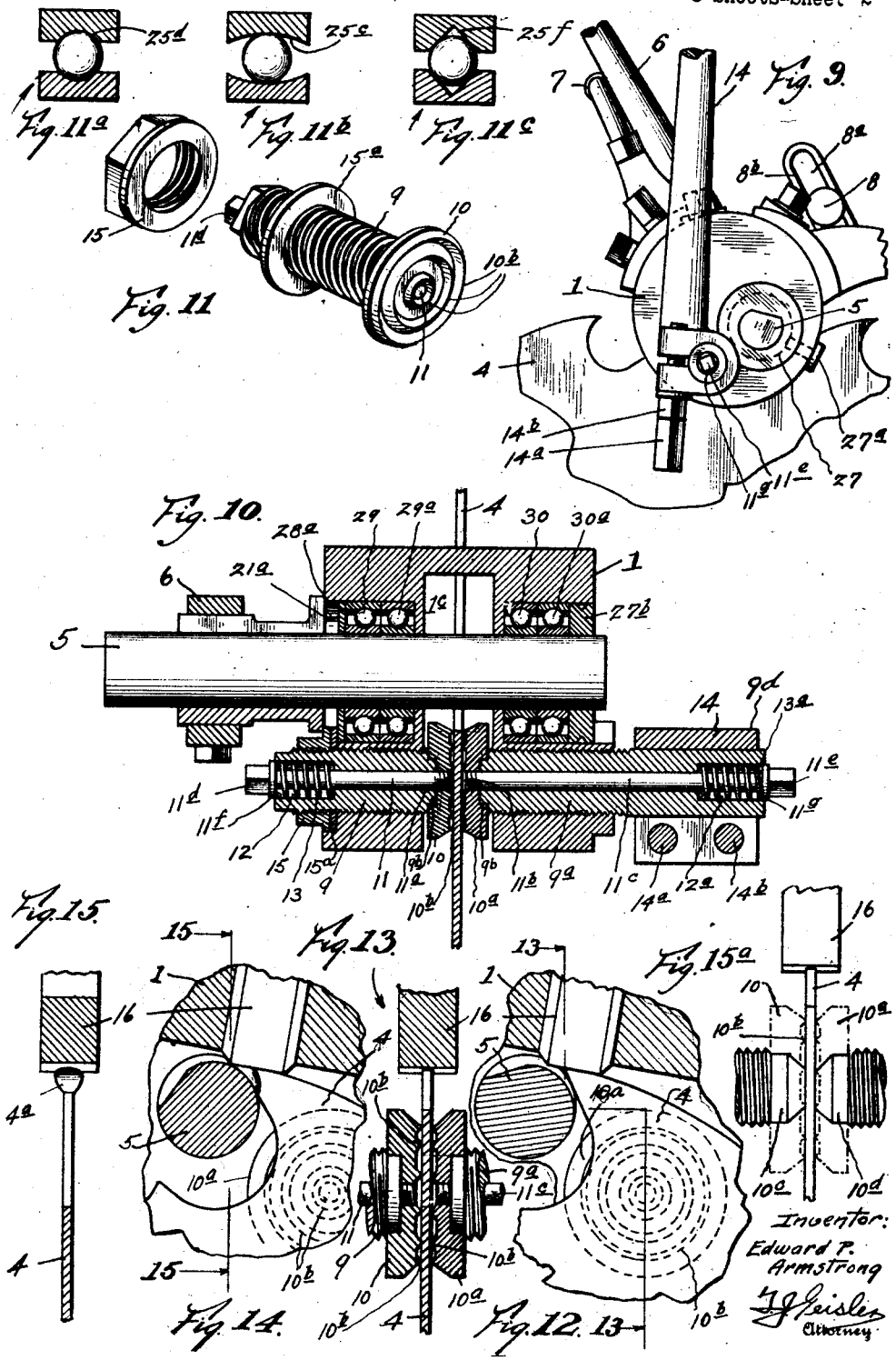

Jan. 31, 1928.  E. P. ARMSTRONG  1,657,735

SAW SWAGE

Filed Aug. 27, 1924  3 Sheets-Sheet 3

Inventor
Edward P. Armstrong

By
T. J. Geisler
Attorney

Patented Jan. 31, 1928.

1,657,735

UNITED STATES PATENT OFFICE.

EDWARD P. ARMSTRONG, OF PORTLAND, OREGON.

SAW SWAGE.

Application filed August 27, 1924. Serial No. 734,491.

My invention relates to saw swaging devices of the type illustrated in my Letters Patent of the United States, dated respectively, February 18, 1908, and April 29, 1924, bearing numbers, respectively, 879,352 and 1,492,152.

The main object of my invention is to improve the type of saw swage shown in said patents so as to make their operation easier, their hold on the saw more secure, their parts better adapted to withstand the strains imposed upon them by the operation of the device, and at the same time, retain the accuracy of this tool which, of course, is essential.

Further particular objects are:

To provide means for substantially housing the moving parts of the swage so as to prevent dust and grit from entering therein, the housing means being removable so as to permit the inspection and repair of said means.

So to arrange the means by which the saw swage is mounted on the saw as to clamp the sides of the saw as close to the point of the saw tooth as practicable, thereby to support the saw tooth firmly against flexing while undergoing the swaging operation.

To provide anti-friction bearings for the rotatable die which are completely housed and thus substantially protected against dirt accumulating therein and arranged to efficiently withstand the thrust of said swaging die in operation.

So to construct the swage head that the anvil will be supported along its entire length and to resist displacement of its working end during the swaging operation.

To provide means upon the clamping screws to accommodate the slight flexure and play of the threads of said screw in the head, without permitting the locking nut to move out of its set position. An incidental feature of this improvement is the provision of a recess for the resilient washer used for this purpose, which permits the washer to be entirely enclosed within the head thus to be held against dislodgement by the twisting of the locking nut when it is being tightened upon the clamping screw.

To obtain a saw swage provided with anti-friction bearings removably held in place, and with operation devices also removably held in place, the holding means for said anti-friction bearings being independent of said operating devices, which will permit the latter to be removed for adjustment or inspection without disturbing said anti-friction bearings.

To provide a gage for saw swages of this character, the use of which will eliminate all guess work in the setting of the anvil relatively to the rotatable die which will thus result in the anvil being set with extreme accuracy.

To provide a member, having a circular periphery, mounted in a circular bore, fast to the cam-shaped die at each side of the saw receiving slot, thus providing means for preventing its axis from gyrating due to insufficient "bearing" support.

The details of construction and mode of operation of my invention will hereinafter be described with reference to the accompanying drawings.

In the drawings:

Fig. 1 is a fragmentary side elevation of my swage mounted upon a portion of a band saw blade;

Fig. 2 is a transverse section taken on a plane through the swage head on the line 2—2 of Fig. 3;

Fig. 3 is a larger scaled longitudinal section taken on a plane indicated by the line 3—3 of Fig. 2;

Fig. 4 is a similar scaled section taken on a plane indicated by the line 4—4 of Fig. 3;

Fig. 5 is a similar scaled section taken on a plane indicated by the line 5—5 of Fig. 3 with parts shown in full;

Fig. 6 is a fragmentary elevation of the swage head taken on the line 6—6 of Fig. 2, and shows the swaging die in section.

Fig. 7 is a section taken on a plane indicated by the line 7—7 of Fig. 6;

Fig. 8 is a larger scaled view of one anti-friction bearing of the ball type with the swaging die mounted therein, the swaging die being shown in section;

Fig. 9 is a fragmentary side elevation of my improved swage mounted upon a saw blade taken in the direction of the arrow 9 in Fig. 2;

Fig. 10 is a larger scaled section taken substantially on the line 10—10 of Figs. 1 and 6, except that a plurality of anti-friction bearings are provided for the rotatable die;

Fig. 11 is a perspective view of one clamping screw with the tightening nut shown as removed;

Figure 16:
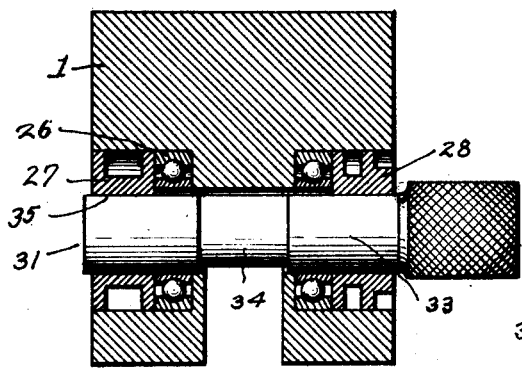
Figure 17:
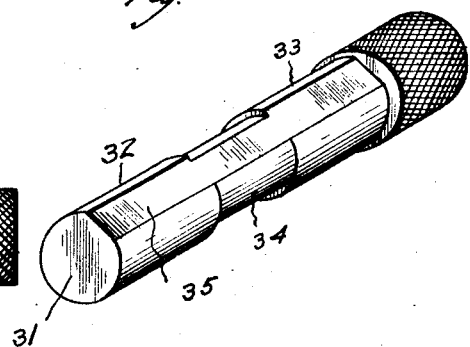
Figure 18:
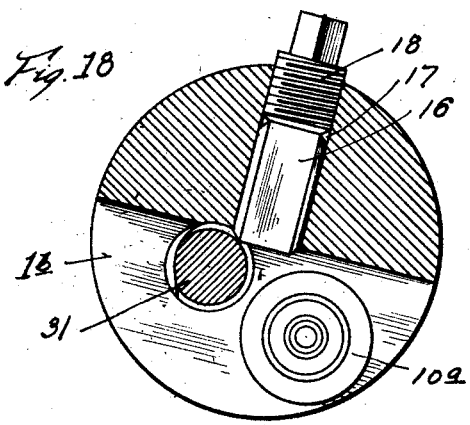
Figure 19:
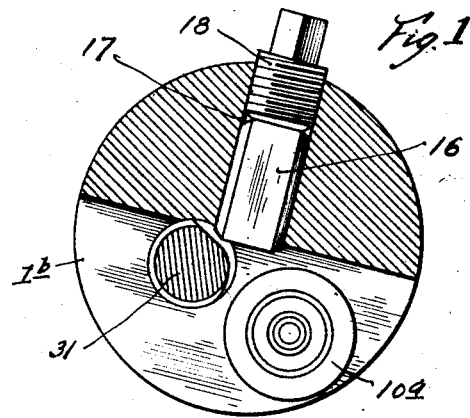
Figure 20:
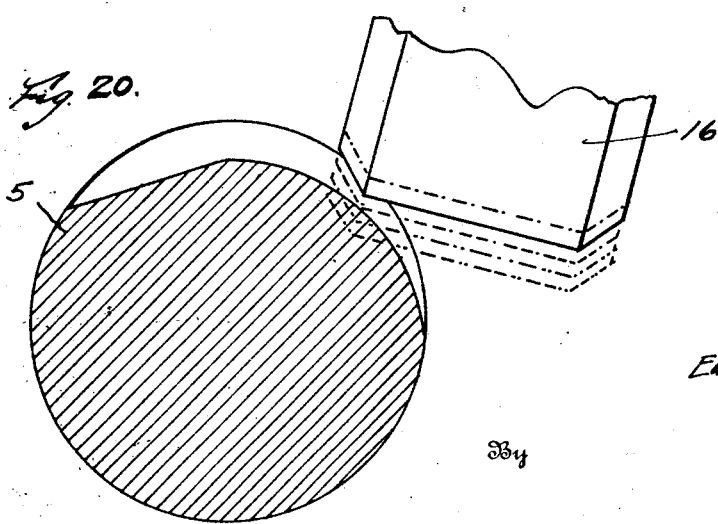

Figs. 11$^a$ to 11$^c$, inclusive, diagrammatically show the difference between the specific type of ball bearings used in my device and common types used;

Fig. 12 is a diagrammatic representation of a portion of one saw tooth, the anvil, and the swaging die in the position assumed before the commencement of the swaging operation;

Fig. 13 is a section through the devices taken on the line 13—13 of Fig. 12;

Fig. 14 is a diagrammatic representation of the same parts after the completion of the swaging operation;

Fig. 15 is a section taken on the line through the anvil and the saw tooth taken substantially on the line 15—15 of Fig. 14;

Fig. 15$^a$ diagrammatically shows the effective support given the saw tooth against flexure by a clamping screw having a larger head;

Fig. 16 is a longitudinal section through a swage head showing my improved setting gage in position;

Fig. 17 is a perspective view of my gage;

Fig. 18 is a transverse section through the head and shows how the gage controls the position of the anvil;

Fig. 19 is a similar section illustrating how the gage can be removed after the anvil has been set;

Fig. 20 is a larger scaled diagrammatic view of a rotatable die and the anvil, and illustrates the range of setting of said anvil.

My improved swage is provided with a bifurcated head 1, which is adapted to be clamped to a saw and carries the operating devices, and is provided with an outstanding guide arm 2 provided with a shoe 3 which bears upon a tooth of the saw 4 and adjusts the head relatively to the saw tooth to be swaged.

Said head 1 is bifurcated by a slot 1$^c$ in which the saw 4 is arranged and the spaced portions 1$^a$ and 1$^b$ thus straddle the saw tooth. The cam-shaped swaging die 5 extends transversely through said bifurcated portions and across the slot 1$^c$ in cylindrical bores 20 and 21, hereinafter described. Said swaging die is of substantial length and of uniform cross section so that any portion of the die can be used to perform the swaging operation. Thus when one portion of the die becomes worn it may be shifted longitudinally so a different portion may be used to perform said operation. The swaging die is provided with an operating handle 6 which is clamped to the hub 6$^a$ which bears against the side of the swage head 1. Said hub is provided with a shoulder 6$^b$ which abuts against the swage head and is held by the overhanging lip 6$^c$ fastened to the head and by this means the die 5 is held in the bores 20 and 21. The rotation of the operating handle 6 is limited in one direction by the stop 7 carried by the head and in the other direction by the stop 8 which is adjustable in an elongated slot 8$^a$ in a bracket 8$^b$.

Clamping screws 9 and 9$^a$ fasten the swage head to the saw, and extend through the bifurcated portions 1$^a$ and 1$^b$ of the swage head and are provided at their inner ends with rotatable saw engaging heads 10 and 10$^a$, which are of larger diameter than the shanks of said clamping screws. Said heads are provided on their engaging faces with a plurality of concentric flanges 10$^b$ which are adapted to bite into the saw to obtain a firm engagement therewith as illustrated in detail in Fig. 11.

In this figure the clamping screw 9 alone is shown, and it is to be understood that the screw 9$^a$ is substantially the same except that said screw 9$^a$ is relatively adjustable and is provided with a handle 14 for rotating the same. The screw 9 is provided with a locking nut 15 and a resilient washer 15$^a$ for holding said clamping screw in set position.

As shown in Fig. 10, the rotatable heads 10 and 10$^a$ are mounted respectively on stud-like protuberances 9$^b$ on the ends of the clamping screws. These stud-like protuberances are of the same diameter as the clamping screws at the base of their threads. In the past considerable difficulty has been encountered in the providing of said clamping screws with rotatable heads, because the force exerted by the swaging die upon the saw tends to cause the heads to be sheared from off their shanks. To provide a rotatable connection between these parts, heretofore, it was considered necessary that the connecting parts be made of considerably smaller diameter than said clamping screws, in order to permit the assembled clamping screws to be inserted through the hole provided therefor in the swage head.

I have discovered that if the rotatable heads are made disc-like, as shown in Fig. 10, and of such thickness that both of said rotatable heads may be inserted in the slot 1$^c$ in the swage head, and manually held in position, the spindles 11 and 11$^c$ may be threaded into position to hold said rotatable head upon said clamping screws. The spindle 11 journalled in the clamping screw 9 and the spindle 11$^c$ in the clamping screw 9$^a$ are threaded upon their inner ends, as 11$^a$ and 11$^b$, respectively, to permit said spindle to be fastened on said rotatable heads. The other ends of said spindles are squared as 11$^d$ and 11$^e$ and are provided with collars 11$^f$ and 11$^g$.

The clamping screws 9 and 9$^a$ are provided with recesses 12 and 12$^a$ respectively in their ends in which coil springs 13 and 13$^a$ are mounted about the spindles. These coil springs bear against the collars 11$^f$ and 11$^g$ on the spindles at one end and against the inner faces of said recesses 13 and 13ª at the other, and tend to force the spindles 11 and 11ᶜ outwardly. This action tends to hold the disc-like heads 11ª and 11ᵇ against the stud-like protuberances 9ᵇ and 9ᵉ, although it permits them to yield slightly and to move longitudinally in said screws.

The screw 9ª is adjustable relatively to the screw 9 and the screw 9ª is provided with an operating handle 14 fastened to the cylindrical portion 9ᵈ thereof, by means of a split bearing which is contracted by two bolts 14ª and 14ᵇ, the bolt 14ª being provided with a longer head than the bolt 14ᵇ, so that one may be tightened with a wrench without interfering with the other.

The clamping screw 9 is held in the portion 1ª of the swage head by a lock-nut 15 threaded about the said screw and adapted to be partially contained in a recess, an enlarged portion of the bore in which the clamping screw is threaded.

A resilient washer 15ª is provided between the lock-nut 15 and the portion 1ª of the swage head which allows a limited longitudinal movement of the clamping screw 9 whereby the free movement between the threads of the clamping screw 9 is prevented.

The anvil 16 upon which the rotatable swaging die 5 operates is longitudinally adjustable in the radially disposed hole 17, by an adjusting screw 18. The anvil is fixed in set position by a set screw 19 which seats against one flattened side of said anvil, the opposite sides of the anvil being firmly supported by the encompassing wall portions of the swage head. The saw 4 to be swaged is placed in the slot 1ᶜ, and as can be noted in Fig. 3, the working ends of the anvil extend only a slight distance into the slot 1ᶜ to engage the teeth of the saw to be swaged.

Furthermore, since considerable stress is imposed on the working end of the anvil, it is necessary that this end be firmly supported as close to the work as practicable; otherwise the swaging operation may not be efficiently done, and great difficulty in this respect has heretofore been experienced.

I have therefore so arranged my swage head that the walls thereof will support the anvil firmly close to its working end.

To this end, the before mentioned bores 20 and 21, in which the swage die 5 is arranged are provided with enlarged recesses in which are mounted anti-friction bearings 25 and 26, and which are enclosed therein from the groove 1ᶜ in the swaging head by the wall portions 23 and 24 which form a circular opening equal to the normal diameter of the bores, and by this construction, I provide additional support for the end of the anvil 16, which would otherwise extend unsupported into the groove 1ᶜ, with a consequent tendency to twist under the strain of the swaging operation.

This construction also serves to prevent dirt and dust entering from the groove 1ᶜ and collecting on the anti-friction bearings.

The anti-friction bearings are preferably of the ball type and are made up of two races spaced apart by ball bearings. The bearing 25 is made with an inner race 25ª and an outer race 25ᵇ and is provided with ball bearings 25ᶜ. The anti-friction bearing 26 is made up with similar races 26ª and 26ᵇ spaced apart by ball bearings 26ᶜ. The inner faces of said races are formed as annular grooves of a radius equal to that of the ball bearings, Fig. 11ª.

I consider this a very important feature in my invention because the mounting of the races and the balls in this manner cause the races to encompass the balls for a substantial distance, thus preventing the balls from being flattened out and crushed by the action of the swaging die.

In all anti-friction bearings of the ball type with which I am familiar, the races are either flat or are provided with annular grooves of larger radius than that of the balls, as shown in Fig. 11ᵇ. The use of this type of ball bearing is not successful because the strains of the swaging operation are diametrically opposed and tend to flatten the ball bearings which destroys the accuracy of the tool and this is, of course, essential and as this construction would require frequent replacements, it is not in my mind practical.

By providing a race of substantially the same curvature as the balls I provide virtually a cradle support at each side of the ball in which the strains of the swaging operation are distributed about the ball and are not diametrically opposed and the tendency to flatten is eliminated.

Another type of ball bearing which I consider superior to the type shown in Fig. 11ᵇ is that shown in Fig. 11ᶜ. In this figure the groove 25ᶠ is triangular, the faces making substantially a right angle with each other. The ball seats in this groove so that the points of contact are at each side of the vertical center line as shown in this figure and at equal distances therefrom. And thus, the strains on the ball are distributed so as not to be concentrated on two diametrically opposed points on the ball.

The swaging die 5 is circular in cross section for about half its circumference and then tapers on one side to a plane surface, which makes its center eccentric and provides the swaging action against a saw tooth as it is rotated, Figs. 12, 13 and 14.

I provide collars 27 and 28 about the die 5 on the outside of the anti-friction bearings, which on their inner peripheries are formed to exactly fit about the die 5 and on their outer peripheries to fit in the circular bores of the swage head in which the swaging die 5 is arranged, as shown in Fig. 9.

Difficulty has heretofore been encountered in mounting said type of cam-faced rotatable dies in circular bearings because the force exerted upon said die in the swaging operation has caused the bearings to wear slightly and creates a slight play therein, and by this construction, I provide a bearing for the swage die which is supported on its entire length and in which there is no tendency for the die to become loose, due to the uneven wear of the bearings.

These collars also serve as dust covers for the outsides of the anti-friction bearings. The collar 27 is held in set position relatively to said anti-friction bearings by a set screw 27$^a$ which extends radially through said head to engage a circumferential groove 27$^b$ in said collar. The other collar 28 is held in position by the overlapping of the resilient washer 15$^a$ and the shoulder of the nut 15, as shown in Fig. 6.

In Fig. 10 I show how a plurality of ball bearings 29 and 29$^a$ can be mounted in the recesses 20$^a$ and 21$^a$ without lengthening said recess or enlarging the swage head to such a degree as to make the same unwieldy. I merely make the collars 25$^b$ and 28$^a$ thinner and mount them closer to the edge of the recesses 20$^a$ and 21$^a$ respectively.

In Figs. 12 to 15$^a$ inclusive, I diagrammatically illustrate the cooperative action of the swaging die, the anvil, and the clamping screw upon the saw. Before the saw tooth is initially swaged it is of substantially uniform thickness, as shown in Fig. 13, but the rotation of the swaging die 5 causes the end of the tooth to be upset and made wider, as at 4$^a$, in Figs. 14 and 15 and if the position of the anvil 16 varies the teeth will be swaged to different degrees.

Thus it is important that the anvil be held tightly in place so that the swage will be uniform throughout all the teeth in the saw. For example, if the bore in which the anvil is adjusted should become worn the anvil would vary slightly and the degree of swage given to the tooth would also vary. It is, therefore, important that the head support the anvil against relative movement along its entire length, which is the feature brought out in my present invention, because the force exerted by the rotatable die against the anvil is very great and if the anvil is permitted to move even slightly by the successive applications of said die, the play increases quickly to such an extent that in a short time the swage is rendered useless, because it is impossible to take out this play unless the radial hole for said anvil is rebored and an oversize anvil inserted therein.

I have shown in Fig. 15$^a$ a comparison in size of the heads of the clamping screws 10$^c$ and 10$^d$, 10$^d$ being the head usually provided by saw swage manufacturers at the present time. The area of contact of said clamping screw 10$^d$ is relatively small compared with the length of the saw tooth which extends above the screw head and which is subjected to the swaging action of the rotatable die. If the saw is relatively thin and flexible the action of the swaging die often does not upset the end of the saw tooth, but merely causes the saw to be flexed sidewise about said clamping screws.

As shown in broken lines in this figure, the support given by the larger head 10 and 10$^a$ for the clamping screws is readily apparent. The larger heads not only permit the screws to clamp the saw blade closer to the point of the saw tooth, but also provide a large surface of contact which tends to prevent the saw blade from flexing about the clamping screw and these results are attained without making the swage head unduly large.

Referring now to Figs. 16 to 20, I show an improved swage gauge 31, provided with end portions 32 and 33 of the same shape as the swaging die 5, a central portion 34, which is circular and provided with a longitudinal plane surface 35 for convenience in withdrawing the gauge past the anvil after the anvil has been adjusted.

In practice, the swaging die 5 will be removed and the gauge 31 inserted in its place and rotated until the circular portion 34 of the gauge is adjacent the anvil 16. The anvil will then be adjusted to bear against the gauge and be tightened in place.

The gauge will then be rotated back to its first position and withdrawn and the die replaced, set for the swaging operation.

A number of gauges may be used of different diameters, to enable the anvil to be set to a number of different positions, as illustrated in Fig. 20, and thus it is always assured that the die will be set uniformly for a particular type of saw.

I claim:

1. In a saw swage of the character described, a saw clamping screw provided on its inner end with a bearing head of relatively larger diameter, removably mounted, said screw being provided with an axial bore, a spindle journaled in said bore, said spindle being provided with means for engaging said bearing head, and yielding means engaging said spindle to hold said bearing head in place.

2. In a saw swage of the character described, a saw clamping screw provided on its inner end with a bearing head of relatively larger diameter removably mounted, said screw being provided with an axial bore, a spindle journaled in said bore, said spindle being provided with means for engaging said bearing head, and a spring engaging said spindle to hold said bearing head in place.

3. A swage of the character described comprising a bifurcated swage head, opposed saw clamping screws threaded into said head, one of said screws being relatively fixed, the other being adjustable relatively thereto, said fixed screw provided with means for locating said screw relatively to said head, a relatively resilient washer on said screw, and a locking nut adapted to compress said washer against said head to hold said fixed screw in set position, the degree of compression of said washer being greater than the play and flexure of the engaging threads of said screw and said head.

4. A swage of the character described comprising a bifurcated swage head, opposed saw clamping screws threaded into said head, one of said screws being relatively fixed, the other being adjustable relatively thereto, said fixed screw provided with means for locating said screw relatively to said head, a recess in said head about said screw, a relatively resilient washer on said screw seated in said recess, and a locking nut adapted to compress said washer in said recess to hold said fixed screw in set position, the degree of compression of said washer being greater than the play and flexure of the engaging threads of said screw and said head.

5. A swage of the character described comprising a bifurcated swage head, opposed saw clamping screws threaded into said head, one of said screws being relatively fixed, the other being adjustable relatively thereto, said fixed screw provided with means for locating said screw relatively to said head, a recess in said head about said screw, a relatively resilient washer on said screw seated in said recess, and a locking nut formed with a circular shoulder, said shoulder and said washer both being substantially the same diameter as said recess and said locking nut adapted to compress said washer in said recess, to hold said fixed screw in set position, the degree of compression of said washer being greater than the play and flexure of the engaging threads of said screw and said head.

6. In a saw swage, a head, means for clamping said head to the saw operated upon consisting of two opposed clamping screws, one of said screws being relatively stationary, the other being adjustable relatively thereto, said adjustable screw provided with a circular portion, an operating lever for said adjustable screw having a clamping portion adapted to grip said circular portion of said clamping screw, said clamping portion consisting of a split bearing having a plurality of tightening screws, said screws having different length heads, for the purpose described.

7. A gage for a saw swage, said saw swage provided with a slotted head having a transverse bore for the insertion of a die, the bore intersecting the slot and an anvil adjustable to project a predetermined distance into said bore, said gage comprising a rod like shouldered body adapted to be inserted in said bore and extending across said slot, said shoulder adapted to position the body longitudinally in said slot, the end portions of said gage being made exactly the same size and shape as the supports for said swage die, and the middle portion of said gage which bridges said slot being of reduced diameter to provide a stop surface in said bore against which the anvil may be set.

8. A gage for a saw swage, said saw swage provided with a slotted head having a transverse bore for the insertion of a die, the bore intersecting the slot and an anvil adjustable to project a predetermined distance into said bore, said gage comprising a rod like shouldered body adapted to be inserted in said bore and extending across said slot, said shoulder adapted to position the body longitudinally in said slot, the end portions of said gage being made exactly the same size and shape as the supports for said swage die, and the middle portion of said gage which bridges said slot being of reduced diameter to provide a stop surface in said bore against which the anvil may be set, said gage having a flattened portion to permit the gage to be withdrawn past the projecting portions of the anvil.

9. In a saw-swage of the character described, the combination of a head provided with a bore for the anvil, and having spaced portions provided with cylindrical die-receiving cavities entering their exterior sides, said cavities terminating at their inner ends in tranverse wall portions integral with that portion of the head spanning the space separating said head portions, said spanning-head portion lying close to the plane touched by the die, and constituting a bearing firmly supporting the working end of the anvil.

10. In a saw-swage of the character described, the combination of a head provided with a bore for the anvil, and having spaced portions provided with cylindrical die-receiving cavities entering their exterior sides, said cavities terminating at their inner ends in transverse wall portions integral with that portion of the head spanning the space separating said head portions, said spanning-head portion lying close to the plane touched by the die, and constituting a bearing firmly supporting the working end of the anvil, said cavities having a greater diameter than that of the circle inscribing the die, said wall portions at the inner ends of said cavities having bores corresponding with said circle; and anti-friction bearings for the die, located in said cavities.

11. In a saw-swage of the character described, the combination of a head provided with a bore for the anvil, and having relatively wide spaced portions provided with cylindrical die-receiving cavities entering their exterior sides, said cavities terminating at their inner ends in transverse wall portions integral with that portion of the head spanning the space separating said head portions, said spanning-head portion lying close to the plane touched by the die, and constituting a bearing firmly supporting the working end of the anvil; said cavities having a greater diameter than that of the circle inscribing the die, said wall portions at the inner ends of said cavities having bores corresponding with said circle; and anti-friction bearings for the die, located in said cavities, said bearings occupying part of the length of said cavities; and collars, adapted to receive the die, closing the outer ends of said cavities, said collars provided with holes conforming with the cross-section of the die.

12. In a saw swage of the character described, comprising a head provided with spaced portions, the combination of clamping-screws threaded through said spaced portions, the inner ends of said clamping screws projecting into the space separating said portions, relatively rotatable bearing-heads mounted on said projecting end-portions, means for holding said bearing-head in place, said bearing-heads having a substantially greater diameter than said clamping screws, whereby the clamping force can be applied a substantial distance beyond the periphery of the clamping screws and thus close to the point of the saw-tooth.

13. In a saw swage of the character described, comprising a head provided with spaced portions, the combination of clamping-screws threaded through said spaced portions, the inner ends of said clamping screws projecting into the space separating said portions, the projecting end portions being reduced to provide shoulders, relatively rotatable bearing-heads mounted on said reduced projecting end-portions, means for holding said bearing-head in place, said bearing-heads having a substantially greater diameter than said clamping screws, whereby the clamping force can be applied a substantial distance beyond the periphery of the clamping screws and thus close to the point of the saw-tooth.

14. In a saw swage of the character described, comprising a head provided with spaced portions, the combination of clamping-screws threaded through said spaced portions, the inner ends of said clamping screws projecting into the space separating said portions, relatively rotatable bearing-heads mounted on said projecting end-portions, spindles axially extending through said clamping screws and threaded into said bearing-head in place, said bearing-heads having a substantially greater diameter than said clamping screws, whereby the clamping force can be applied a substantial distance beyond the periphery of the clamping screws and thus close to the point of the saw-tooth.

15. In a saw swage of the character described, comprising a head provided with spaced portions, the combination of clamping-screws threaded through said spaced portions, the inner ends of said clamping screws projecting into the space separating said portions, the projecting end portions being reduced to provide shoulders, relatively rotatable bearing-heads mounted on said reduced projecting end-portions, spindles axially extending through said clamping screws and threaded into said bearing-head in place, said bearing-heads having a substantially greater diameter than said clamping-screws, whereby the clamping force can be applied a substantial distance beyond the periphery of the clamping screws and thus close to the point of the saw-tooth.

EDWARD P. ARMSTRONG.